Dec. 23, 1958  W. F. SKEATS  2,866,040
LOW-VOLTAGE CURRENT-LIMITING FUSE
Filed Sept. 13, 1957
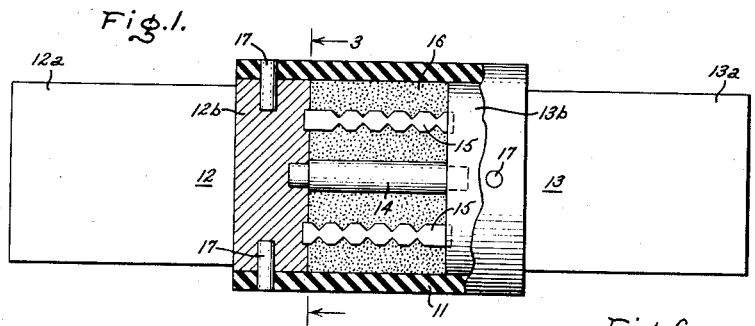
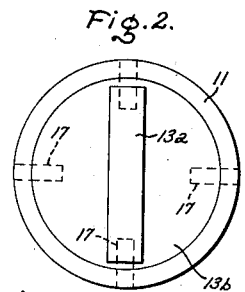
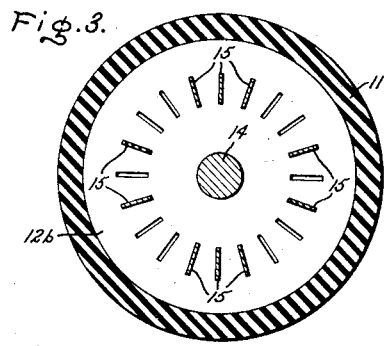
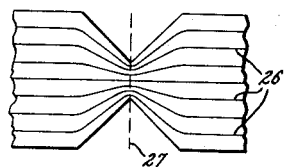
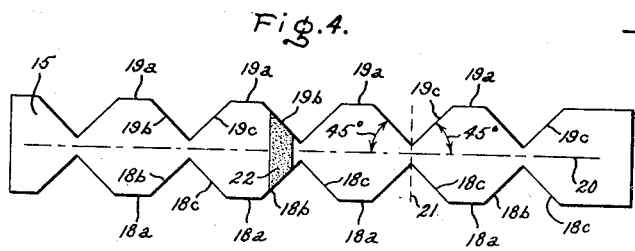
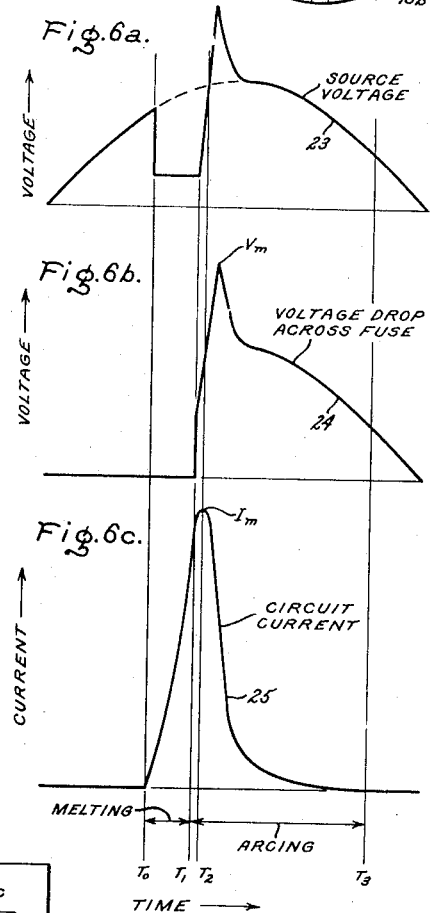
Inventor:
Wilfred F. Skeats,
by
His Attorney.

United States Patent Office 2,866,040
Patented Dec. 23, 1958

2,866,040

LOW-VOLTAGE CURRENT-LIMITING FUSE

Wilfred F. Skeats, Lansdowne, Pa., assignor to General Electric Company, a corporation of New York Application September 13, 1957, Serial No. 683,864

6 Claims. (Cl. 200—131)

This invention relates to electric fuses, and more particularly to a low-voltage high-interrupting-capacity current-limiting fuse.

It is common practice today in the art of low-voltage (i. e., 750 volts or less) alternating-current electric power distribution to use current-limiting protective fuses wherever distribution systems are capable of producing short-circuit currents of relatively large magnitudes. These fuses provide protection for the individual distribution circuits and utilization apparatus during both protracted overloads and severe short-circuit or fault conditions. Such protective fuses are designed to operate only after an appreciable time delay in response to protracted overload conditions. But in the event of a severe short-circuit or fault condition, fuse operation takes place so very quickly that the protected circuit is interrupted before the fault current has an opportunity to attain its available maximum value. In this respect the amount of current that can flow in the protected circuit is limited to a safe level that is far below the high peak magnitude of short-circuit current available in the system. It is a general object of this invention to provide such a current-limiting fuse having improved operating characteristics.

Electric utilization apparatus when continuously energized by relatively low levels of overload current will tend to overheat, and excessive heat may ultimately cause permanent damage to the electric insulation in the apparatus. However, the thermal damage characteristic of most electric utilization apparatus is such that a small amount of overload current can be safely endured for a relatively long period of time. Optimum protection is provided by a fuse whose "long-time" operating characteristic closely parallels the thermal damage characteristic of the protected apparatus. It is particularly desirable for the fuse to delay operation during protracted overload conditions for as long as is commensurate with adequate thermal protection, because the long-time characteristic of a fuse reflects its ability to override the transient magnetizing or inrush current which usually occurs when utilization apparatus is initially energized. Therefore, a specific object of this invention is to provide a low-voltage current-limiting fuse that operates accurately, consistently and with particularly long time delay in response to protracted overload conditions.

Whenever a fault or short-circuit condition develops in electric utilization apparatus, the resulting short-circuit current instantly produces unusually great magnetic forces proportional to current squared. These magnetic forces are capable of causing serious damage both to the windings and other mechanical parts in the apparatus and indirectly to any human being who happens to be in the vicinity of the damaged apparatus. Therefore, it is necessary to construct utilization apparatus having sufficient mechanical strength to withstand the greatest stress expected in view of the short-circuit current capacity of the particular electric circuit to which the apparatus will be connected. Many low-voltage electric power distribution systems are capable of producing short-circuit current having a peak magnitude greater than one-thousand times the full-load rated current of the protected apparatus, and it is apparent that the apparatus would have to be disproportionately large and expensive if it were required to withstand the severe stresses caused by such short-circuit current.

In order to reduce the maximum possible short-circuit current in the utilization apparatus and in other equipment connected to a faulted distribution circuit—thereby reducing the short-circuit stresses and correspondingly reducing the size, strength and cost of the apparatus and equipment—current-limiting fuses are provided. These fuses operate to interrupt the protected circuit while the circuit current is still very appreciably less than the maximum available short-circuit current which the system is otherwise capable of supplying. A measure of the current-limiting ability of such a fuse is its "let-through $i^2t$." Those skilled in the art will understand that the expression "let through $i^2t$" refers to the $\int i^2 dt$ during the current interrupting process, where $i$ is the instantaneous current flowing through the fuse and $t$ is time. It is an object of all current-limiting fuse manufacturers to reduce let-through $i^2t$ as far as possible. By reducing let-through $i^2t$, not only can the protected utilization apparatus be made smaller and less expensive, but also the size and strength requirements of the fuse structure itself are reduced. Therefore, another specific object of this invention is the provision of a low-voltage current-limiting fuse having extremely small let-through $i^2t$.

Another object of the invention is to provide a low-voltage current-limiting fuse that will normally conduct a relatively large rated current without overheating.

Still another object of this invention is to provide a very small and compact low-voltage current-limiting fuse that will remain within predetermined temperature limits during normal conditions and that will operate safely and without rupturing its enclosing casing when interrupting both overload and short-circuit currents.

It is a further object of the invention to provide an improved low-voltage current-limiting fuse having extremely short melting and arcing times when subjected to a severe short-circuit or fault condition.

In carrying out my invention in one form, an enclosed current-limiting electric fuse having a filler of pulverulent arc quenching material is provided with an elongated conducting link embedded in the filler. A plurality of longitudinally spaced apart pairs of laterally opposed peaked notches are provided, the two notches of each pair being disposed in opposite sides of the conducting link. Each notch is defined by two inclined sidewalls which enclose an angle substantially within the range of 80 to 100 degrees. The junction of the inclined sidewalls forms the peak of the notch, and the minimum cross-sectional area of the conducting link is defined by the peaks of each pair of laterally opposed notches. In one aspect of the invention, five longitudinally spaced apart pairs of notches are formed in the link, and a plurality of such links are arranged in parallel spaced apart relation.

My invention will be better understood and its various objects and advantages will be more fully appreciated from the following description taken in conjunction with the accompanying drawing in which:

Fig. 1 is an elevational view, partly in section, of a fuse embodying my invention;

Fig. 2 is an end view of the fuse shown in Fig. 1;

Fig. 3 is an enlarged sectional view of the Fig. 1 fuse along the line 3—3;

Fig. 4 is an enlarged front elevation of one of the fuse links of the fuse shown in Fig. 1;

Fig. 5 is an enlarged front elevation of one tapered portion of the fuse link shown in Fig. 5; and Figs. 6a, 6b and 6c are graphical representations of certain operating characteristics representative of the interrupting action of the fuse.

Referring now to Figs. 1 and 2, I have shown a multiple-link current-limiting fuse comprising a tubular casing 11 of insulating material provided at opposite ends with electrically conductive terminal elements 12 and 13. The terminals 12 and 13 have outwardly protruding knife-blade type studs or connecting portions 12a and 13a and disk-shaped closure portions 12b and 13b which are fitted into the ends of the tubular fuse casing 11. A spacing rod 14 having a suitable shoulder near each end is axially disposed in the casing between the closure disks 12b and 13b to determine the spacing between the inner surfaces of these two disks.

Twenty radially disposed shallow slots or grooves are provided in the inner surface of each of the closure disks 12b and 13b. These grooves are spaced at equal angular intervals about the axis of the fuse (Fig. 3). Each groove in a closure disk is aligned with a corresponding groove in the opposing closure disk, and elongated, ribbon-like fuse elements or links 15 are disposed between aligned pairs of the grooves. The opposite ends of each fuse link are fitted into the appropriate grooves where they are fastened by means of solder or the like. The precise number of fuse links 15 thus connected in parallel circuit relation between the closure disks depends upon the dimensions of the fuse link and the normal current carrying rating of the fuse.

While assembling the fuse, the casing 11 is filled (through a suitable filler hole not shown) with a body of suitable pulverulent arc extinguishing material, such as quartz sand, which is indicated in Fig. 1 by the reference number 16. This material completely fills the tubular casing 11 between the closure disks 12b and 13b, and the fuse strips 15 are thus directly embedded in the filler. The casing 11 is secured at each end to the closure disks 12b and 13b by appropriate means such as, for example, the pins 17, thereby completing the structure of the fuse.

Refer now to Fig. 4 which is an enlarged front elevation of one of the fuse links 15 shown in Fig. 1. It will be understood that the ribbon-like link is quite thin in relation to its length and width. As is shown in Fig. 4, a plurality of pairs of laterally opposed substantially sharp-pointed V-shaped incisions or notches are made at longitudinally spaced intervals in opposite sides of the link. Each pair of notches defines a tapered fusing portion of the link having decreasing width and consequently having reduced cross-sectional area with respect to the adjoining portions of the link. Thus, the link 15 comprises a plurality of longitudinally spaced apart or discrete portions of maximum cross-sectional area, each defined by substantially parallel lengthwise edges 18a and 19a, and the intermediate tapered portions of minimum cross-sectional area each having oblique or inclined lengthwise edges 18b, 18c and 19b, 19c.

Each notch in the fuse link 15 is defined by two inclined sidewalls comprising respectively the adjoining sections 18b and 18c—or 19b and 19c—of the oblique edge of the corresponding tapered portion of the link. In accordance with my invention, the inclined sidewalls are disposed to enclose an angle of approximately 90 degrees, and the junction of these two sidewalls forms a substantially sharp point or peak of the notch. For reasons that will become clear later in this specification, I intend by "an angle of approximately 90 degrees" to cover any angle substantially within the range of 80 to 100 degrees. As is indicated in Fig. 4, both of the inclined sidewalls of each notch preferably slope toward the longitudinal centerline or axis 20 of the fuse link at generally the same angle, such as 45 degrees, with respect to the centerline.

The minimum cross-sectional area of each tapered portion of the fuse link 15 is established by the peaks of the laterally opposed notches. These peaks define a single plane 21 of minimum cross-sectional area that is positioned substantially midway between the opposite ends of each tapered portion. For reasons which will be made clear hereinafter, the peak of each notch preferably is sharply pointed as illustrated in Fig. 4, whereby the axial length of each fuse section having minimum cross-sectional area is substantially zero. However, due to inexact manufacturing or perhaps for other reasons, such a preferred configuration may not be obtained, and therefore when I refer to the peak or apex of the notch or to the single plane of minimum cross-sectional area I intend to cover all reasonable deviations from the above-mentioned preferred configuration. For example, I consider as being within the scope of my invention a rounded peak or a peak that is flattened to the extent that the minimum cross-sectional area of the fuse link extends for a practically negligible length such as .01 inch.

It will be observed in Fig. 4 that the two end portions of the link 15 have different axial lengths. In other words, the tapered portions of the link are not symmetrically spaced with respect to the opposite ends of the link. This makes it possible, when assembling the fuse, to orient adjacent parallel links between closure disks 12b and 13b in reverse relationship with respect to each other, so that the tapered portions of one link are longitudinally offset with respect to the corresponding tapered portions of the two adjacent links. The two fuse links 15 shown in Fig. 1 illustrate this reverse or opposing orientation. Such an arrangement in a multi-link current-limiting fuse has been fully described and claimed in a copending patent application S. N. 478,687, Vincent N. Stewart, filed on December 30, 1954, and assigned to the assignee of the present application. The advantage of this arrangement is that the arc quenching filler is utilized more efficiently thereby improving the interrupting characteristics of the fuse.

The fuse link 15 is formed of suitable high-conductivity metal, preferably silver. As can be seen in Fig. 4, an overlay or strip 22 of alloy-forming material, such as a eutectic lead-tin composition, is applied to the surface of one of the tapered portions of the link. The overlay 22 may be a sprayed-metal coating such as that fully disclosed and claimed in a copending patent application S. N. 610,327, Oscar C. Frederick, filed March 30, 1956, and assigned to the assignee of the present application. The overlay preferably is located on the central tapered portion between the plane of minimum cross-sectional area and the adjacent discrete portion of maximum cross-sectional area that is nearer to an end of the link. In other words, the overlay is disposed on the relatively cooler half of the central tapered portion, and when heated it tends to flow through the plane of minimum cross-sectional area toward the hotter half of the tapered portion. As is well understood by those skilled in the art, the lead-tin overlay 22 enables the central tapered portion of the link to melt or fuse, during protracted relatively low overload-current conditions, with a much lower temperature rise than would otherwise be possible. This effect arises from the fact that the lead-tin overlay 22 when heated by protracted overload currents forms with the silver an alloy having a melting point lower than the melting point of the silver alone.

In order to provide a compact fuse structure of relatively high normal current carrying capacity and improved long-time and short-time operating characteristics, I prefer at present to make each one of the fuse links 15 of the current-limiting fuse 2.00 inches long, .01 inch thick, .27 inch wide at the discrete portions, and .03 inch wide at the planes of minimum cross-sectional area. Of course, these specific dimensions are illustrative only and in no way limit my invention. I have found that ten such fuse links connected in parallel and preferably arranged as is shown in Fig. 3 will provide a normal current carrying capacity of 800 amperes A.-C. When applied in a 600 volt circuit, optimum results are obtained by using five serially related pairs of laterally opposed notches in each fuse link.

By utilizing the notch configuration described with particularity hereinbefore, I am able to obtain particularly desirable performance by the current-limiting fuse. In various ways to be fully explained hereinafter, the use of peaked notches having sidewalls that diverge from the peak at a generally 90-degree angle with respect to each other contributes both to a longer time delay during protracted overload conditions and to reduced let-through $i^2t$ during short-circuit or fault conditions.

The manner in which the current-limiting fuse operates to interrupt current in a low-voltage circuit will now be considered in detail. Under normal, steady state conditions, the fuse will continuously conduct its full-load rated current of I amperes (R. M. S.) without exceeding a predetermined temperature rise above ambient temperature and without interrupting the circuit. In the well understood manner, current I flowing through the resistance R of the fuse generates heat at the rate of $I^2R$. In each fuse link the resistance per unit length is greatest at the planes of minimum cross-sectional area, and consequently the generation of heat is most rapid and intense at these planes. The heat generated at each plane of minimum cross-sectional area is dissipated by convection and radiation to the surrounding sand and eventually to the tubular casing 11, and by thermal conduction to the adjacent discrete portions of the link—which portions have greater cross-sectional area and are cooler—and ultimately to the end terminals 12 and 13 of the fuse. It will be apparent that as long as the fuse conducts rated current there is a balance between heat generated and heat dissipated by the various means mentioned above, so that the temperature at the hottest part of the fuse will reach a constant, permissible level greater than ambient but below the melting point of the fuse.

When an overload condition develops, the current being conducted by the fuse increases above its rated value I, and additional heat is generated more rapidly than it can be dissipated at the aforesaid constant, permissible temperature level. After a relatively long period of time, depending upon the amount of overcurrent, the temperature at the hottest point of the fuse will rise to the melting or fusing point. Since the central tapered portion of each fuse link 15 is the hottest of the five serially related tapered portions (the other four being located closer to the relatively cool end terminals 12 and 13), the plane of minimum cross-sectional area of this portion is the first to reach the critical melting-point temperature. Thereupon the fuse link melts at the central plane of minimum cross-sectional area, a gap appears, and the circuit is opened.

As pointed out hereinbefore, it is desirable to have the long-time response of the fuse be particularly slow at relatively low values of overcurrent. In a fuse designed to have a predetermined low melting $i^2t$ under short-circuit conditions, the length of time required for fuse operation during a given overload condition may be extended by increasing the rate of heat dissipation. The rate of heat dissipation by means of conduction is increased by reducing the number of serially related tapered portions and also by reducing the angle enclosed by the sidewalls of each notch in the link. By reducing the angle enclosed by the sidewalls of the notches, or in other words by enlarging the angle of slope of the oblique edges of the fuse link, the axial rate of increase of cross-sectional area of the link as measured from each plane of minimum cross-sectional area is increased, and consequently the thermal conductivity of each tapered portion of the link between the plane of minimum area and the relatively cooler discrete portions of the link is improved. It should be noted at this point that the most desirable number of tapered portions and the optimum angle of the sidewalls of the notches are not determined solely upon the consideration of a longer operating time during overload conditions, and other factors relating to the short-time operating characteristic of the fuse, which factors will be considered in detail hereinafter, must be considered in this regard.

One feature of the present invention that is particularly significant in connection with extending the long-time characteristic of the fuse is the use of substantially sharp-pointed or peaked notches. The minimum cross-sectional area of a fuse link lies in a plane defined by the opposing peaks of each pair of notches, and therefore the axial length of fuse section having minimum cross-sectional area is substantially zero. The maximum rate of heat generation occurs in the single plane of minimum cross-sectional area, and with this arrangement less heat will be generated during a given period of time than would be the case if heat were being generated at the same maximum rate throughout a fuse section having a finite length. The heat generated at the plane of minimum cross-sectional area is readily dissipated by conduction, since the portions of the fuse link immediately adjoining both sides of this plane are relatively cool. By thus reducing heat generation and aiding heat dissipation, the peaked configuration of the laterally opposed notches contributes most significantly to the improved long-time operating characteristic of my fuse.

When a short-circuit or fault condition develops, the current being conducted by the fuse will increase extremely rapidly toward an available peak magnitude that may be hundreds or thousands or times greater than the full-load rated current I within less than .01 second. The charts shown in Figs. 6a, 6b and 6c will be referred to in describing the circuit interrupting phenomena when such a fault condition occurs. These charts indicate the relationship of certain electric quantities with respect to time during a period of one-half cycle on a 60 cycles per second basis. The curve 23 in Fig. 6a represents the sinusoidal voltage of a low-voltage (e. g., 600 volts R. M. S.) bus or the like which provides the source of electric power for the circuit being protected by the current-limiting fuse under consideration. In Fig. 6b the line 24 represents the voltage drop across the fuse, and in Fig. 6c the line 25 represents the circuit current which flows through the fuse. The magnitude of the maximum current $I_m$ allowed to pass during the circuit interrupting operation depends upon the fuse rating and upon the magnitude and asymmetry of the available short-circuit current. For example, I have found by tests that an 800 ampere fuse built in accordance with the present invention will limit the maximum current $I_m$ to 60,000 amperes in a 600-volt system otherwise capable of producing an asymmetrical peak short-circuit current of 480,000 amperes (the available symmetrical short-circuit current being 200,000 amperes R. M. S.).

Beginning at the moment $T_0$ when the severe fault condition occurs, the source voltage 23 causes the circuit current 25 to increase at an extreme rapid rate $$\frac{di}{dt}$$

limited only by the circuit inductance L (resistance being negligible). The voltage drop $$L\frac{di}{dt}$$

in the circuit inductance must be equal to the instantaneous magnitude of source voltage, thereby satisfying the fundamental requirement of zero net voltage in a closed electric circuit. This sudden increase in circuit current generates a large amount of heat at the planes of minimum cross-sectional area of each fuse link. Heat is generated so rapidly that there is practically no opportunity for it to be dissipated, and in a relatively short period of time the melting point is reached substantially simultaneously at all planes of minimum cross-sectional area. The reduced source voltage 23 during the melting period between times $T_0$ and $T_1$, as indicated in Fig. 6a, is caused by the induced voltage drop in the source impedance of the bus which is supplying the faulted circuit. The voltage drop across the fuse is negligible during the melting period because of the relatively low resistance and inductance of the fuse.

The time required for melting is minimized by the use in the fuse links of symmetrical notches each having a single substantially sharp point or peak. I have found that the tapered portions of link 15 tend to melt straight along the planes of minimum cross-sectional area. This may be explained with reference to Fig. 5 where the lines 26 represent the pattern of current flow along a length of a fuse link. It will be observed that the current is most crowded, i. e., the current density is greatest, precisely along the bisector 27 of the angle formed by the junction of the inclined sidewalls of each notch. In accordance with my invention, the bisector 27 corresponds to the single plane of minimum cross-sectional area. Consequently the greatest heat is generated in this plane and melting will occur straight across the link. Only the minimum amount of material need be heated to the melting-point temperature in order to complete the melting process and open a gap in each tapered portion of the fuse link. Obviously less time is required to complete this melting process than would be necessary if more material had to be affected, and the let-through $i^2t$ is reduced accordingly.

At the instant of time $T_1$, the melting point has been reached and a gap appears substantially simultaneously at each one of the planes of minimum cross-sectional area of each fuse link. Due to the inductance of the faulted circuit, the circuit current cannot instantaneously go to zero but will continue to flow, and an electric arc is established across each one of the gaps. The heat of the arc causes each tapered portion of the silver link to vaporize at opposite ends of the arc, and silver vapors are rapidly dispelled. These hot vapors interact with the cool sand filler in the arcing zone, and a portion of the sand is fused and forms essentially non-conductive fulgurite. This action dissipates arc energy, thus cooling and eventually extinguishing the arc, and it has the effect of inserting a high resistance into the current path.

As can be seen in Fig. 6b, the voltage drop across the fuse rises practically instantaneously at the moment $T_1$ to a magnitude equal to the aggregate of the initial voltage drops across the five serially related gaps of each link. The magnitude of this initial surge of voltage across the fuse is directly related to the number of serially related tapered portions, and by using an appropriate number of such portions I am able to obtain a desirable high level of initial surge voltage which contributes to the minimization of let-through $i^2t$. The plurality of tapered portions also permits effective utilization of the sand in dissipating arc energy, thereby more rapidly quenching the arcs. The selection of five tapered portions in a 600 volt fuse is primarily governed by the foregoing considerations, and for lower voltage service fewer such portions would be used.

Immediately following the formation of the arcs at time $T_1$, each gap grows progressively longer, each arc is rapidly extended, and the arc voltage rises accordingly. Within an extremely short period of time (for example at $T_2$ in Figs. 6a–6c), the voltage drop 24 across the fuse (Fig. 6b) has attained a magnitude equal to the instantaneous magnitude of the source voltage 23, and it is at this moment that the circuit current 25 (Fig. 6c) reaches its maximum value $I_m$. Further extension of the gaps and the accompanying increase in arc voltage cause fuse voltage 24 to exceed the source voltage 23, and the circuit current is forced to decrease rapidly from $I_m$ at a rate $$\frac{di}{dt}$$

that will produce a voltage rise in the circuit inductance L just equal to the difference between voltages 24 and 23, thereby maintaining zero net voltage in the closed electric circuit. As the arc continues to grow and be cooled in the fuse, and the circuit current steadily decreases from its maximum magnitude following time $T_2$, the voltage drop across the fuse will quickly reach a maximum value $V_m$ (Fig. 6b) and then decay.

I have found that the rate at which the arc voltage rises above its initial surge at $T_1$ to its subsequent peak and the magnitude of the peak voltage ultimately reached are significantly affected by the configuration of the tapered portions of each fuse link. It is desirable to have the arc voltage increase very rapidly, thereby quickly suppressing the circuit current and minimizing let-through $i^2t$. The rate of voltage rise is made greater by reducing the slope of the oblique edges of the tapered portions of the fuse links, or in other words by increasing the angle enclosed by the sidewalls of the laterally opposed notches. This decreases the axial rate of increase of mass of the link with reference to the plane of minimum cross-sectional area, and by thus reducing the amount of silver that has to be vaporized per unit length, it permits a more rapid growth of the gap and extension of the arc.

I have found that enlarging the angle enclosed by the sidewalls of the notches in the fuse link also raises the level of the maximum voltage $V_m$. Although a relatively large $V_m$ is desirable from the point of view of a greater rate of decrease of circuit current and consequently less let-through $i^2t$, there is a practical limit beyond which the fuse voltage should not be permitted to go. This limit is determined by the inherent inability of certain utilization apparatus (such as junction-type semi-conductors or rectifiers), or of the insulation employed in the fuse structure itself and in other circuit components, to withstand relatively high surges of voltage.

At this point the various factors affecting the selection of the optimum angle of the laterally opposed peaked notches can be summarized. In order to aid heat dissipation and thereby to extend the long-time characteristic of the fuse during relatively light overload conditions, the sidewalls of each notch should enclose a relatively small angle. In order to ensure a relatively high rate of rise of arc voltage thereby minimizing let-through $i^2t$ during fault conditions, the sidewalls should enclose a relatively large angle. But the angle enclosed should not be so large that the maximum fuse voltage during circuit interruption exceeds the breakdown limits of insulation or of the utilization apparatus being protected. I have been able successfully to satisfy all of the foregoing requirements by selecting an angle of approximately 90 degrees, and a fair approximation to the ideal configuration is realized with any angle substantially within the range of 80–100 degrees.

It can be observed in Figs. 6a–6c that arcing in the fuse continues as the fuse voltage decays from its maximum value $V_m$ until a time such as $T_3$ when the current has been brought to zero and the arc is extinguished. The overall melting and arcing times of a fuse constructed in accordance with my invention when interrupting current many times the full-load rated current will be seen to be substantially less than the period of one-half cycle of 60 cycles per second voltage.

While I have shown and described a preferred form of my invention by way of illustration, many modifications will occur to those skilled in the art. I therefore contemplate by the claims which conclude this specification to cover all such modifications as fall within the true spirit and scope of my invention.

What I claim as new and desire to secure by Letters Patent of the United States is:

1. In an electric current-limiting fuse: an enclosing casing provided with a pair of electrically conductive terminals in spaced apart relation; an elongated fuse link mounted in said casing between said terminals; said link having a plurality of longitudinally spaced apart tapered portions of minimum cross-sectional area; each one of said tapered portions being defined by a pair of laterally opposed notches in the link; each one of said notches having two inclined sidewalls enclosing an angle substantially within the range of 80 to 100 degrees and an apex comprising the junction of said inclined sidewalls, whereby the minimum cross-sectional area of each tapered portion is defined by the apexes of the associated pair of laterally opposed notches; and a body of pulverulent arc-extinguishing material filling said casing and directly embedding said link.

2. In an electric current-limiting fuse: an enclosing casing provided with a pair of electrically conductive terminals in spaced apart relation; an elongated fuse link mounted in said casing between said terminals; said link having a plurality of longitudinally discrete portions of maximum cross-sectional area and a plurality of intermediate tapered portions of reduced cross-sectional area; each one of said tapered portions being formed by a pair of laterally opposed peaked notches in the link; each one of the said notches being defined by a pair of sidewalls converging from the adjoining discrete portions of the link at a generally 90-degree angle with respect to each other and meeting to form the peak of the notch, whereby the cross-sectional area of each tapered portion of said link is reduced to its minimum dimension in a plane defined by the peaks of the associated pair of laterally opposed notches; and a body of pulverulent arc-extinguishing material filling said casing and directly embedding said link.

3. In a current-limiting fuse for a 600 volt alternating-current electric circuit: an enclosing casing provided with a pair of electrically conductive terminals in spaced apart relation; an elongated fuse link mounted in said casing between said terminals; said link including five longitudinally spaced apart fusing portions of minimum cross-sectional area; each one of said fusing portions being defined by a pair of laterally opposed notches in the link; each one of said notches having a pair of sidewalls and a peak, both of said sidewalls being disposed to diverge from said peak at an angle of approximately 90 degrees with respect to each other, whereby the minimum cross-sectional area of said link is defined by the opposing peaks of each pair of notches; and a body of pulverulent arc-extinguishing material filling said casing and directly embedding said link.

4. In an enclosed current-limiting electric fuse having a filler of arc quenching material: an elongated conducting link embedded in said filler and having a plurality of longitudinally spaced apart pairs of laterally opposed substantially sharp-pointed notches in opposite sides thereof, each one of said notches being defined by two sidewalls which are both inclined generally at an angle within the range of 40 to 50 degrees with respect to the longitudinal centerline of said link and which meet each other at the point of the notch, whereby the minimum cross-sectional area of said link is established by the points of a pair of said laterally opposed notches.

5. In an enclosed current-limiting electric fuse having a filler of arc extinguishing material: an elongated ribbon-like fuse link embedded in said filler and including at least three longitudinally spaced apart portions having substantially parallel lengthwise edges and at least two intermediate portions having oblique lengthwise edges, each one of said oblique edges comprising two sections respectively sloping from opposite ends of the associated intermediate portion toward the longitudinal centerline of said link at angles substantially within the range of 40 to 50 degrees with respect to said centerline, said two sloping sections of each oblique edge being disposed to join each other in a plane normal to said centerline positioned substantially midway between said opposite ends of the intermediate portion, whereby the cross-sectional area of said link is reduced in each intermediate portion to a minimum in the associated mid-position plane.

6. In an enclosed current-limiting electric fuse having a filler of arc extinguishing material: a plurality of elongated fuse links embedded in said filler in parallel spaced apart relationship with respect to each other, each one of said links having therein a plurality of longitudinally spaced apart pairs of laterally opposed peaked notches defined by inclined sidewalls which enclose angles substantially within the range of 80 to 100 degrees, the junction of the inclined sidewalls which define each one of said notches comprising the peak of the corresponding notch, whereby the minimum cross-sectional area of each one of said links is established by the peaks of a pair of said laterally opposed notches.

References Cited in the file of this patent

UNITED STATES PATENTS

| | | |
|---|---|---|
| 2,157,906 | Lohausen | May 9, 1939 |
| 2,734,111 | Kozacka | Feb. 7, 1956 |
| 2,809,257 | Swain | Oct. 8, 1957 |

FOREIGN PATENTS

| | | |
|---|---|---|
| 961,745 | France | Nov. 28, 1949 |